LOUIS JOSEPH JEAN-BAPTISTE CHENEAU.
NUT LOCK.
APPLICATION FILED OCT. 18, 1911.

1,071,508.

Patented Aug. 26, 1913.

Witnesses:

Inventor
Louis J. J. B. Cheneau
by

UNITED STATES PATENT OFFICE.

LOUIS JOSEPH JEAN-BAPTISTE CHÊNEAU, OF PARIS, FRANCE.

NUT-LOCK.

1,071,508.  Specification of Letters Patent.  Patented Aug. 26, 1913.

Application filed October 18, 1911. Serial No. 655,265.

*To all whom it may concern:*

Be it known that I, LOUIS JOSEPH JEAN-BAPTISTE CHÊNEAU, a citizen of the French Republic, residing at 3 Avenue Junot, Paris, France, have invented certain new and useful Improvements in Nut-Locks, of which the following is a specification.

This invention has reference to nut locks, and more especially to improvements in that class of nut locks wherein the locking means is in the form of a helical spring, the outer end of such spring being bent to engage in a hole in the nut, while its coils are adapted to embrace the bolt, so that any tendency of the nut to unscrew causes the aforesaid coils to tighten upon the bolt, thus increasing the locking action and preventing the nut from working loose. It is found, in practice, with locking devices of this description, that considerable difficulty is experienced in unscrewing the nut after the end of the spring has been removed from the hole, and the present invention comprehends an improved construction of nut lock in which the spring locking member has its inner end so bent or formed that after the outer end has been removed from the hole, the said inner end, when the nut is turned, will bear forcibly against the surface of the nut and enter in the hole therein, whereby it will be turned with the nut and, in consequence, will increase the diameter of the coils, thus releasing the locking action of said coils.

Figure 1:
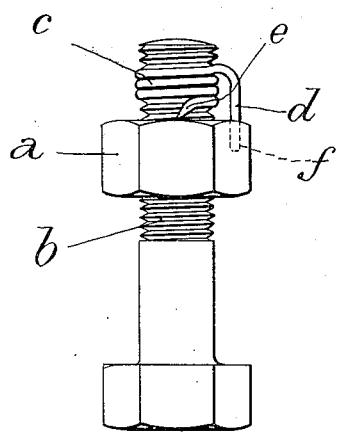
Figure 2:
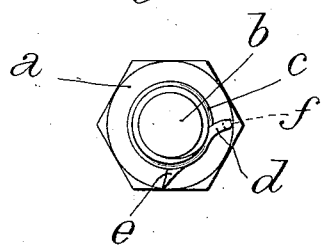

The invention will be readily understood from the description which follows, and from the accompanying drawing, Figure 1 of the said drawing being a side elevation of a nut lock embodying the invention, and Fig. 2 a plan view thereof.

Referring more particularly to the drawing, $a$ is a nut of conventional type adapted to be mounted upon a threaded bolt $b$ and to be retained thereon by the locking spring $c$, as hereinafter described. This spring $c$ is formed with a number of coils wound one above another, and may be either coiled on the bolt or screwed thereon in the manner of a nut. The outer or upper end $d$ of the spring is prolonged and bent downward, as shown, and the terminal thereof is adapted for reception in a hole $f$ formed in the upper face of the nut, the said end $d$ being so disposed, however, that its terminal normally lies beyond or outside of the circle described by hole $f$ when the nut is rotated, and must be forcibly bent backward to effect its engagement in said hole. The inner or lower end $e$ of the spring is also prolonged or extended slightly, and is bent outward and downward so that its terminal will forcibly engage the upper face of the nut; this terminal is so positioned that it coincides with the circle described by hole $f$ and will enter said hole when the terminal of the prolongation $d$ is removed therefrom and the nut is turned.

I claim as my invention:

The combination, with a threaded bolt; of a nut mounted thereon and having a hole formed in its upper face; and a helical spring locking member coiled around said bolt above said nut and having both of its ends prolonged and bent downwardly so as to bear forcibly against the aforesaid face of the nut, the terminal of one of said ends normally lying outside of the circle described by said hole when the nut is turned and being adapted to be forced thereinto, to lock the nut in position upon the bolt, while the terminal of the other end coincides with said circle, and is adapted to enter said hole when the first named terminal is withdrawn therefrom and the nut is turned, to increase the diameter of the coils of said locking member and release its locking action.

In testimony whereof I have hereunto set my hand in the presence of two witnesses.

LOUIS JOSEPH JEAN-BAPTISTE CHÊNEAU.

Witnesses:
 DEAN B. MASON,
 PAUL BLUM.